J. A. CHURCHILL.
CHAIN-PUMP BUCKET.

No. 178,735. Patented June 13, 1876.

WITNESSES
Henry N. Miller
Franck L. Ourand

INVENTOR
J. A. Churchill
By Alexander Mason
Attorneys

UNITED STATES PATENT OFFICE.

JOHN A. CHURCHILL, OF COUNCIL BLUFFS, IOWA.

IMPROVEMENT IN CHAIN-PUMP BUCKETS.

Specification forming part of Letters Patent No. 178,735, dated June 13, 1876; application filed May 10, 1876.

*To all whom it may concern:*

Be it known that I, J. A. CHURCHILL, of Council Bluffs, in the county of Pottawattamie and in the State of Iowa, have invented certain new and useful Improvements in Chain-Pump Buckets; and do hereby declare that the following is a full, clear, and exact description thereof, reference being had to the accompanying drawings, and to the letters of reference marked thereon, making a part of this specification.

The nature of my invention consists in the construction and arrangement of a chain-pump bucket, as will be hereinafter more fully set forth.

In order to enable others skilled in the art to which my invention appertains to make and use the same, I will now proceed to describe its construction and operation, referring to the annexed drawing, in which—

Figure 1:
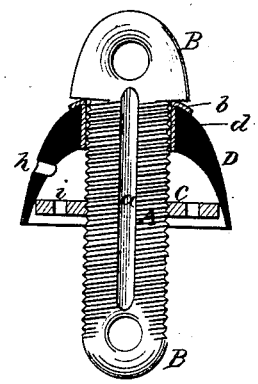
Figure 2:
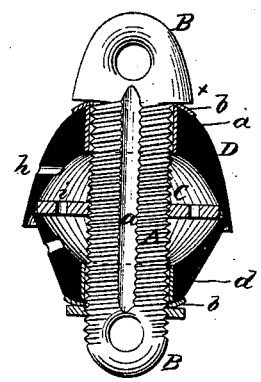
Figure 3:

Figure 1 is a section of a chain-pump bucket, with one rubber, embodying my invention. Fig. 2 is a similar view, showing the bucket with two rubbers. Fig. 3 is a view of a sheet-metal sleeve surrounding part of the link.

A represents the bolt or link formed with exterior screw-threads, as shown, also, with one or more longitudinal grooves or channels, $a$, in its sides, and with a loop or eye, B, at each end. On this link is placed a concavo-convex rubber, D, with a nut or washer, C, screwed from the lower end upon the link within the rubber to expand the same, the rubber being held under a shoulder, $f$, at the base of the upper eye B, by a galvanized washer, $b$. Around the link A, in the eye of the rubber, is placed a sleeve, $d$, of tin or other sheet metal, to prevent the rubber working into the threads of the link. Through the side of the rubber D is made a hole, $h$, for the passage of the water into the inside of the bucket, and in the washer or nut C are one or more holes, $i$, for the water to pass down below the bucket. These holes, as well as the grooves $a$ in the link, form vents for the escape of the water that stands in the pump, to prevent freezing.

If desired, two rubbers, D D, may be used, as shown in Fig. 2, being in the manner described in a patent formerly granted to me, in which case the lower bucket will also have a sleeve, $d$, in the eye, as well as a horizontal vent.

Having thus fully described my invention, what I claim as new and desire to secure by Letters Patent, is—

1. The combination of the grooved screw-bolt or link A, concavo-convex rubber D, and interior expanding washer C, substantially as set forth.

2. The concavo-convex rubber D, having vent-hole $h$, and the interior expanding washer C, having vent-holes $i\ i$, as and for the purposes herein set forth.

3. The combination of the grooved screw bolt or link A, metal sleeve $d$, washer $b$, cancavo-convex rubber D, and interior expanding washer C, all constructed substantially as and for the purposes herein set forth.

In testimony that I claim the foregoing I have hereunto set my hand this 17th day of April, 1876.

JOHN A. CHURCHILL.

Witnesses:
W. BROWN,
JNO. H. KEATLEY.